United States Patent [19]

Ziebach et al.

[11] Patent Number: 4,881,570
[45] Date of Patent: Nov. 21, 1989

[54] SEAL FOR VALVES

[75] Inventors: Helmut Ziebach; Peter Lange, both of Lüdenscheid, Fed. Rep. of Germany

[73] Assignee: Flühs Drehtechnik GmbH, Lüdenscheid, Fed. Rep. of Germany

[21] Appl. No.: 210,769
[22] PCT Filed: Aug. 29, 1987
[86] PCT No.: PCT/DE87/00388
    § 371 Date: May 12, 1988
    § 102(e) Date: May 12, 1988
[87] PCT Pub. No.: WO88/02082
    PCT Pub. Date: Mar. 24, 1988

[30] Foreign Application Priority Data

Sep. 12, 1986 [DE] Fed. Rep. of Germany ....... 3631030
Mar. 5, 1987 [DE] Fed. Rep. of Germany ... 8703325[U]

[51] Int. Cl.4 ............................................. F16K 3/08
[52] U.S. Cl. .................................. 137/454.2; 277/186
[58] Field of Search .......................... 137/454.2, 454.6; 277/183, 186

[56] References Cited

U.S. PATENT DOCUMENTS

| 3,780,758 | 12/1973 | Devries | 137/454.6 |
| 3,831,621 | 8/1974 | Anthony | 137/454.6 X |
| 3,913,612 | 10/1975 | Tolnai | 137/454.6 |
| 4,005,728 | 2/1977 | Thorp | 137/454.6 X |
| 4,172,599 | 10/1979 | Forch | 277/186 X |
| 4,240,643 | 12/1980 | Becker | 277/186 X |
| 4,544,168 | 10/1985 | Hans | 277/186 X |

FOREIGN PATENT DOCUMENTS 75323 3/1983 European Pat. Off. .
3145863 6/1982 Fed. Rep. of Germany .
2495266 6/1982 France .

Primary Examiner—Robert G. Nilson
Attorney, Agent, or Firm—Spencer & Frank

[57] ABSTRACT

A valve seal having a profiled ring of a rubber elastic material, and an externally threaded supporting ring which is disposed about and vulcanized to the ring. The external portion of the supporting ring projects outwardly beyond the external surface of the profiled ring.

7 Claims, 1 Drawing Sheet

FIG. 1
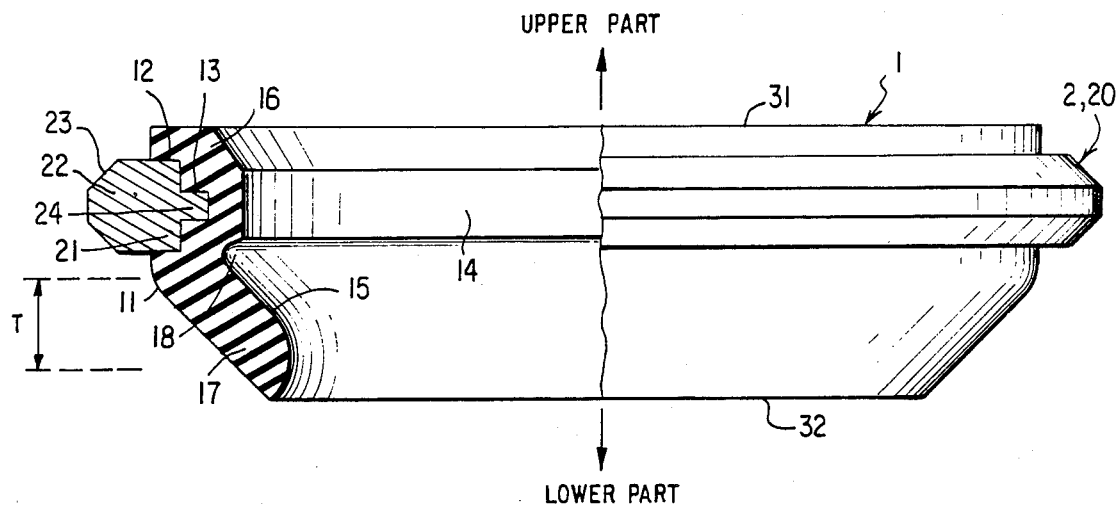
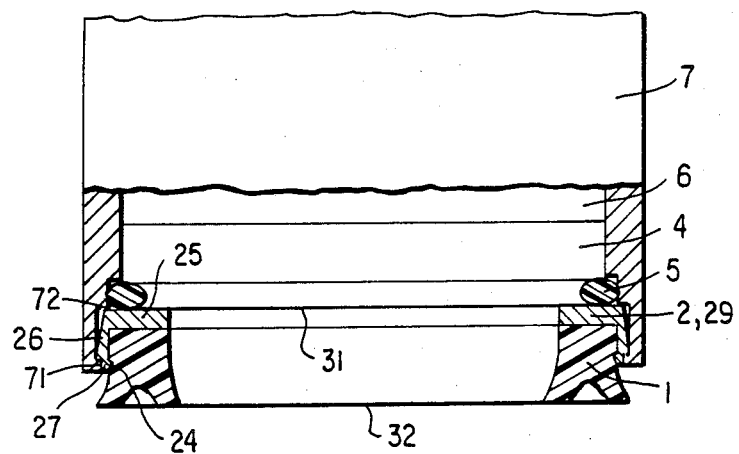
FIG. 2

SEAL FOR VALVES

BACKGROUND OF THE INVENTION

1. Field of the Invention

The invention relates to a seal for valves, in particular for upper valve parts, consisting of a profiled ring of a rubber elastic material, in which a supporting ring is arranged.

2. Brief Description of the Prior Art

A seal of the above-mentioned type is known from the volume control valve described in DE-A1-3 206 481. The supporting ring in the known seal has a rectangular cross section; the profiled ring is formed as a lip seal. An annular recess with a rectangular cross section is provided in the profiled ring and accommodates the supporting ring. The external surfaces of the supporting ring and the profiled ring lie on the same cylindrical surface.

DE-C2-3 207 895 and DE-A1-2 944 520 disclose upper valve parts which in each case comprise a fixed valve seat disc (fixed disc) which is made of a ceramic material, is connected to the internal end face and on which a mobile valve seat disc (control disc) which is also of a ceramic material slides internally and against which a sealing ring rests externally. The sealing ring, which is prestressed, rests loosely against the fixed disc and the housing of the upper valve part and projects beyond the end face.

The sealing ring serves on the one hand as a seal for the housing and the fixed disc and on the other hand as a seal for a valve seat which is provided in a lower valve part with which the upper valve part co-operates. The use of the sealing ring means that the pressure of the component part assembly in the upper valve part cannot be accurately adjusted. Too great a pressure may make the parts stiff, while too low a pressure may result in leakages. Furthermore, due to the adhesive effect between the sealing ring and the valve seat, the upper valve part may unintentionally be dismantled. Unauthorised persons may dismantle the sealing ring.

SUMMARY OF THE INVENTION

The invention aims to remedy the above noted problems of the prior art. The object of the invention is to provide a seal which can be accurately fixed in a valve, in particular in an upper valve part, even in the area of its free end faces. According to the invention, this object is either solved in that the supporting ring is formed as a threaded ring which is provided with an external thread, is vulcanized into the profiled ring and the external part of which projects beyond the external surface of the profiled ring or in that the supporting ring is formed as an unslotted spring ring which has a cross section in the form of a horizontal L, the back of which rests against the internal end face of the profiled ring and the external part (base) of which embraces the external surface of the profiled ring.

After it has been inserted in a valve, the seal according to the invention has a defined position. The pressure of the component part assembly of the valve can therefore be accurately adjusted by means of torque wrenches. The number of parts which are not water-tight due to too low a pressure and the number of stiff parts due to too great a pressure are minimised. Dismantling from the water supply side by non-experts is not possible, or at least only with difficulty. As dismantling from the opposite side, as in the case of the known upper valve parts, is impossible, the upper valve part as a whole cannot be dismantled after it has been installed. Loads taken up by the sealing ring are not transmitted to the inlet disc, but rather to the supporting ring and from the latter to the housing. The load is removed from the inlet disc. Irrespective of different contact pressures, which are determined by the different shapes and depths of the valve seats of the lower valve parts, the pressure between the inlet disc and the control disc is constant. This is of particular importance when the upper valve part is used in the hot water area: After a layer of grease between the discs has been washed away in the course of continuous use, the parts cannot become stiff.

BRIEF DESCRIPTION OF THE DRAWINGS

Two embodiments of the invention are illustrated in the drawing and described in detail hereinbelow. In the drawing:

FIG. 1 shows on one side a longitudinal section and on the other an elevation of the seal enlarged approximately ten times; and FIG. 2 is a partial axial section and partial elevation of a sleeve for an upper valve part with a seal enlarged approximately five times in accordance with a second embodiment of the invention.

DESCRIPTION OF THE PREFERRED EMBODIMENT

The seal shown in FIG. 1 consists of a profiled ring 1 having an external surface and an internal end face of a rubber elastic material and a supporting ring 2 formed as a threaded ring 20. The threaded ring 20 is vulcanized into the profiled ring 1. The profiled ring 1 consists of rubber or plastic with rubber-like properties. The threaded ring 20 consists metal, preferably of brass.

The threaded ring 20 comprises an internal portion 21 and an external portion 22. The external portion 22 is provided with an external thread 23. The profiled ring 1 comprises an external surface 11. An annular groove 12 is provided in the external surface 11 of the profiled ring 1. The annular groove 12 accommodates the internal portion 21 of the threaded ring 20. The external portion 22 and the external thread 23 of the threaded ring 20 project beyond the external surface of the profiled ring 1.

The annular groove 12 has a rectangular cross section. It comprises at its base an additional trough-shaped groove 13. An annular projection 24, which is formed internally onto the internal portion 21, of the threaded ring 20 engages the additional groove 13. The projection 24 and the additional groove 13 interlock in the manner of a tongue and groove joint.

The interior of the profiled ring 1 comprises an annular projection 14 in the cross-sectional area in which the threaded ring 20 is externally set. From the projection 14 to the adjacent end face 31 the internal surface 15 of the profiled ring 1 is in the form of a truncated cone 16 which opens outward. The profiled ring 1 is formed as a lip 17 at the end face 32 distant from the threaded ring 20. There is a relatively large range of tolerance for the seat depth in a lower valve part which is not shown. This is due to the resilient lip 17 of the sealing ring 1. The lip 17 tapers continuously toward the distant end face 32. From the projection 14 to the distant end face 32 the internal surface 15 of the profiled ring 1 is drawn in in the manner of a concave profile 18, which passes into the internal surface of the lip 17, which extends obliquely inward, at the side pointing way from the projection 14. The internal surface of the lip 17 is internally rounded in the area of the end face 32.

The seal is particularly intended for an upper valve part. The end face 31 points toward the upper valve part and the end face 32 toward the lower valve part, which is not shown. The seal is screwed into the upper valve part. A ceramic disc of the upper valve part then rests against the profiled ring 1, in fact against the adjacent end face 31, in the assembled state. The threaded ring 20 may be fixed in the desired position, e.g. by an adhesive which cannot be detached, or only detached with difficulty. The range of tolerance which can be achieved for the seat depth in the lower valve part by means of the lips 17 is marked by a "T" in FIG. 1.

The use of the seal in a sleeve 7 of the upper valve part is chosen for sanitary fittings for the embodiment illustrated in FIG. 2. The term "sleeve" refers not only to an individual structural element, but also to attachments which are formed as sleeves and are produced from the same material as other structural elements, e.g. a sleeve-like head piece.

The supporting ring 2, which is formed as an unslotted spring ring 29, is set in the sleeve 7 at its end face facing the water supply. The profiled ring 1 rests as a sealing ring, which projects beyond the end face of the sleeve 7, against the spring ring 29 at the water supply side. An inlet disc 4 of a ceramic material is held by the sleeve 7 at the side of the spring ring 29 distant from the profiled ring 1. The inlet disc 4 is provided with through-openings, which are not shown. The external diameter of the inlet disc 4 is greater than the internal diameter of the spring ring 29. A control disc 6 of a ceramic material rests against the inlet disc 4 at the side distant from the spring ring 29. The control disc 6 is also provided with through-openings, which are not shown. The through-openings are opened or closed by turning the control disc 6 in relation to the inlet disc 4 held in the sleeve 7. A further sealing ring 5 is arranged between the spring ring 29 and the inlet disc 4.

The sleeve 7 comprises a drawn-in edge 71 at the end face facing the water supply. The sleeve 7 also comprises a shoulder 72 at a spacing from this end face. The bearing surface of the shoulder 72 faces the water supply. The spring ring 29 is held between the drawn-in edge 71 and the shoulder 72. The spring ring 29 is inserted from the water supply side. Once it has "snapped" into the area between the edge 71 and the shoulder 72, the spring ring 29 cannot be removed from the sleeve without force.

The spring ring 29 has a cross section in the form of a horizontal L. Its back 25 faces the inlet disc 4. Its base 26 is held in the sleeve 7, between the drawn-in edge 71 and the shoulder 72. At the free end of the base 26 the spring ring 29 comprises an external annular recess 27, which is adapted to the drawn-in edge 71 of the sleeve 7, and the internal annular projection 24. The external surface of the base 26 rises in a conical manner between the back 25 and the recess 27.

The spring ring 29 is engaged by means of the annular projection 24 in the profiled ring 1 and holds the latter in its position. If the profiled ring 1 is axially loaded, the load is transmitted to the spring ring 29, which is supported at the shoulder 72 and thus transmits the load to the sleeve 7. The load is removed from the inlet disc 4; the latter is constantly subjected to the contact pressure applied by the sealing ring 5 between the spring ring 29 and the inlet disc 4. The spring ring 29 is supported by its annular recess 27 at the drawn-in edge 71 of the sleeve 7 on the side opposite the shoulder 72.

The invention can be used in the industrial valve field, in particular for upper valve parts for sanitary fittings.

We claim:

1. A valve and seal therefor comprising:
   (a) a profiled ring having an external surface and an internal end face formed of a rubber elastic material;
   (b) a supporting ring disposed about said profiled ring;
   (c) said supporting ring being an unslotted spring ring having a cross section in the shape of a horizontal L, the rear portion of said L resting against the internal end face of said profiled ring and the base of said L embracing the external surface of said profiled ring;
   (d) an external portion of said supporting ring projecting outwardly from the center of said ring beyond the external surface of said profiled ring, further including a sleeve, a ceramic inlet disc secured by said sleeve at an end face thereof, said profiled ring projecting beyond said end face, a ceramic control disc resting against said inlet disc at the side thereof distant from said end face, said unslotted spring ring being positioned in said sleeve between said profiled ring and said inlet disc, the internal diameter of said spring ring being smaller than the external diameter of said inlet disc.

2. Seal according to 1 wherein said end face has a drawn-in edge, further including a shoulder spaced from said end face securing said spring ring between said shoulder and said end face.

3. Seal according to claim 2 wherein said rear portion of said L faces said inlet disc and the base thereof is held in said sleeve.

4. Seal according to claim 1 wherein said rear portion of said L faces said inlet disc and the base thereof is held in said sleeve.

5. Seal according to claim 1 further including a sealing ring disposed between said spring ring and said inlet disc.

6. Seal according to claim 5 wherein said end face has a drawn-in edge, further including a shoulder spaced from said end face securing said spring ring between said shoulder and said end face.

7. Seal according to claim 5 wherein said rear portion of said L faces said inlet disc and the base thereof is held in said sleeve.

* * * * *